(12) United States Patent
Taylor (10) Patent No.: US 9,900,351 B2
(45) Date of Patent: Feb. 20, 2018

(54) METHODS, SYSTEMS, AND COMPUTER READABLE MEDIA FOR PROVIDING LEGACY DEVICES ACCESS TO A SESSION INITIATION PROTOCOL (SIP) BASED NETWORK (75) Inventor: Richard C. Taylor, Manotick (CA)

(73) Assignee: GENBAND US LLC, Plano, TX (US)

( * ) Notice: Subject to any disclaimer, the term of this patent is extended or adjusted under 35 U.S.C. 154(b) by 173 days.

(21) Appl. No.: 13/187,269

(22) Filed: Jul. 20, 2011

(65) Prior Publication Data

US 2013/0024575 A1    Jan. 24, 2013

(51) Int. Cl.
H04L 29/06 (2006.01)
(52) U.S. Cl.
CPC ...... H04L 65/1036 (2013.01); H04L 65/1006 (2013.01); H04L 65/1073 (2013.01)
(58) Field of Classification Search
None
See application file for complete search history.

(56) References Cited

U.S. PATENT DOCUMENTS

| 7,599,351 | B2 * | 10/2009 | Gallant et al. | 370/352 |
| 2006/0206504 | A1 * | 9/2006 | Cai et al. | 707/100 |
| 2008/0071917 | A1 * | 3/2008 | Petrovykh | 709/230 |
| 2009/0017796 | A1 * | 1/2009 | Foti | 455/414.1 |
| 2009/0059898 | A1 * | 3/2009 | Chaney et al. | 370/352 |
| 2009/0154451 | A1 * | 6/2009 | Ku et al. | 370/389 |
| 2011/0128954 | A1 * | 6/2011 | Veenstra et al. | 370/352 |
| 2012/0033661 | A1 * | 2/2012 | Knappe | 370/352 |
| 2012/0219127 | A1 * | 8/2012 | Lu et al. | 379/88.17 |

OTHER PUBLICATIONS

NCH Swift Sound, "Difference Between an FXO Adapter and an FXS Adapter", Nov. 8, 2006.*

* cited by examiner

Primary Examiner — Henry Tsang
(74) Attorney, Agent, or Firm — Fogarty LLP (57) ABSTRACT Methods, systems, and computer readable media for providing legacy devices access to a session initiation protocol (SIP) based network are disclosed. One exemplary system comprises a session initiation protocol (SIP) based access proxy element communicatively coupled to a SIP based network that includes a registration engine configured to create a mapped entry in a database that associates an assigned SIP registration identifier to an identifier corresponding to a legacy endpoint device and configured to register the legacy endpoint device into the SIP based network using the assigned SIP registration identifier. The SIP based access proxy element further includes a session management module configured to establish a communications session involving the registered legacy endpoint device by interworking between a legacy control protocol and a SIP based call control protocol using the mapped entry in the database.

19 Claims, 4 Drawing Sheets

METHODS, SYSTEMS, AND COMPUTER READABLE MEDIA FOR PROVIDING LEGACY DEVICES ACCESS TO A SESSION INITIATION PROTOCOL (SIP) BASED NETWORK

TECHNICAL FIELD

The subject matter described herein relates to legacy network equipment and session initiation protocol (SIP) based networks. More specifically, the subject matter relates to methods, systems, and computer readable media for providing legacy devices access to a SIP based network.

BACKGROUND

At present, large service carriers are attempting to collapse fixed legacy line communications networks into a session initiation protocol (SIP) based network, such as a common Internet protocol multimedia subsystem (IMS) core network. Notably, the service carriers believe a common IMS core network will extend the reach of new multimedia services, increase average revenue per user (ARPU), and reduce the total operating expenses (OPEX) associated with the public switched telephone network (PSTN) core.

However, due to difficulties pertaining to the integration of IMS components with the current legacy access infrastructure, any architecture plan that utilizes the associated legacy access infrastructure is a major deterrent to any IMS network consolidation plan. Although IMS is the preferred target architecture and continual replacement of the current PSTN access infrastructure is not economically feasible, most service carriers want to ensure that any investments made in telecommunications networks are IMS compatible but without completely abandoning the substantial PSTN architecture that still exists. Thus, integrating existing legacy copper lines into an IMS core network without modifying the physical access from these legacy lines would be desirable.

A variety of PSTN emulation system (PES) solutions have been developed in an attempt to provide a solution to the aforementioned dilemma. For example, one such PES architecture proposed involves an IMS PES architecture that interworks H.248 gateways (typically as part of a Multi-Service Access Node (MSAN)) with the IMS core network by way of a functional network element called the Access Gateway Control Function (AGCF). However, this IMS PES solution compels a network carrier to rely on an IMS Telephony Application Server (TAS) to provide fully transparent voice over IP (VoIP) services. Similarly, this IMS PES architecture also introduces some problems with service behavior transparency for the end users depending on the user equipment and subscribed feature set. Namely, a network operator does not want to modify a service set that can alter tariffs associated with end users or subscribers. Services, such as access to 911, lawful intercept, support for coin pay phones, support for conventional POTS phones, and support for TTY phones, are provided in the PSTN. Thus, it would be beneficial to utilize a network element capable of providing legacy devices access to an IMS core network without any modification to legacy access lines located within a traditional PSTN.

Accordingly, in light of these difficulties, a need exists for improved methods, systems, and computer readable media for providing legacy devices access to a SIP based network.

SUMMARY

Methods, systems, and computer readable media for providing legacy devices access to a session initiation protocol (SIP) based network are disclosed. One exemplary system comprises a session initiation protocol (SIP) based access proxy element communicatively coupled to a SIP based network that includes a registration engine configured to create a mapped entry in a database that associates an assigned SIP registration identifier to an identifier corresponding to a legacy endpoint device and configured to register the legacy endpoint device into the SIP based network using the assigned SIP registration identifier. The SIP based access proxy element further includes a session management module configured to establish a communications session involving the registered legacy endpoint device by interworking between a legacy control protocol and a SIP based call control protocol using the mapped entry in the database.

The subject matter described herein may be implemented in software, in combination with hardware or in combination with hardware and firmware. For example, the subject matter described herein may be implemented in software executed by a processor. In one exemplary implementation, the subject matter described herein for providing legacy devices access to a SIP based network may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for providing legacy devices access to a session initiation protocol (SIP) based network. Although the following description is made within the context of an Internet protocol multimedia subsystem (IMS) network, any network utilizing a SIP based Internet protocol (IP) solution for VoIP using an application server for addressing legacy lines may be used without departing from the scope of the present subject matter.

In one embodiment, the present subject matter includes an Internet protocol multimedia subsystem (IMS) access proxy element that allows for the integration of legacy lines (e.g., copper telecommunication lines or hybrid fiber coaxial (HFC) cable) into an IMS core network. The IMS access proxy element may be used to receive lines originating from legacy devices via legacy peripheral devices, such as legacy switches (e.g., a TDM switch), line aggregation devices (e.g., a GR303 device or TR08 device), or any other aggregation and control device that supports a legacy line.

The present subject matter allows for the evolution of an IMS core network that incorporates at least a portion of the presently existing public switched telephone network (PSTN) architecture and utilizes the legacy lines. The IMS access proxy element may be embodied as any one of a plurality of deployment models, which may include 1) a softswitch integrated model, 2) a legacy switch wrapper model (i.e., adjunct proxy element), and 3) a switchless model.

The IMS access proxy element of the present subject matter may be embodied in such a manner that the proxy element appears as an "IMS agent" that is directly connected to an IMS core network. For example, the IMS access proxy element may be provisioned with a P-CSCF module that performs P-CSCF functions, such as facilitating registration and supporting communications with the IMS core network. The IMS access proxy element may also include a session management module (e.g., a syntax and semantics protocol module) that is responsible for mapping legacy device protocols (which are used by the legacy devices) to SIP (e.g., a protocol which is used to communicate with the IMS core network over an Mw interface).

Figure 1:
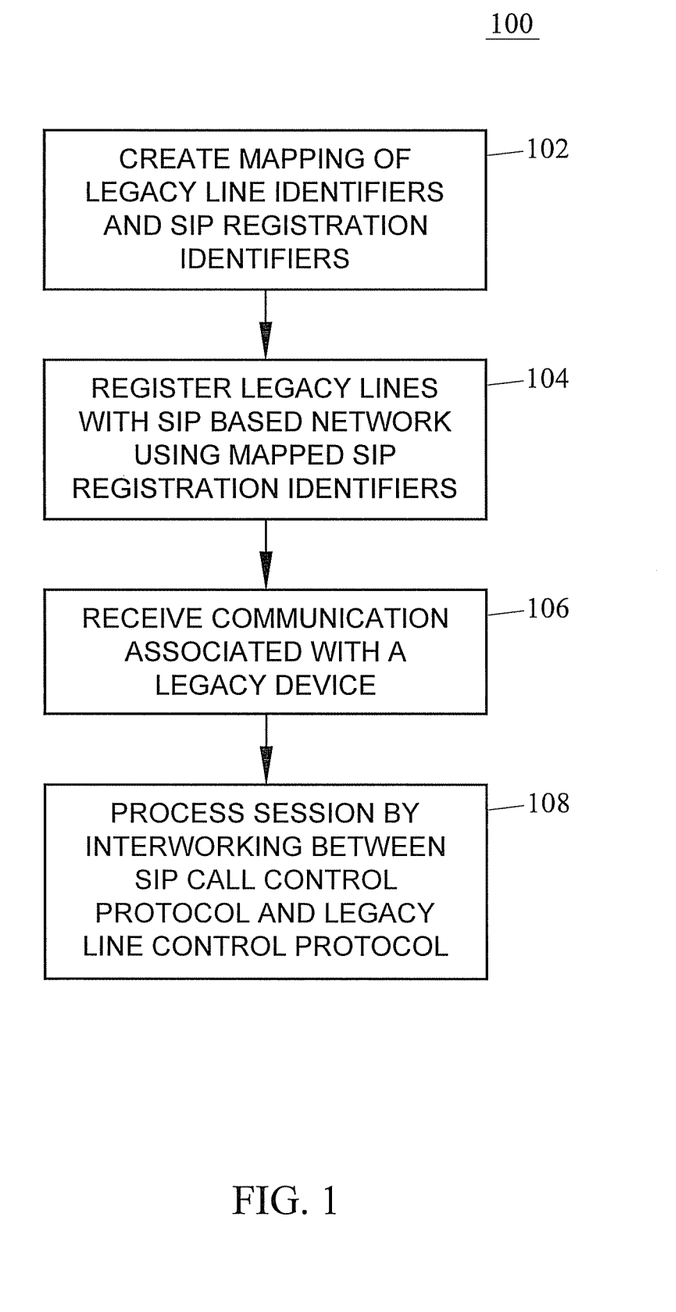
FIG. 1 is a flow chart illustrating a process for providing legacy devices access to a session initiation protocol (SIP) based network are disclosed according to an embodiment of the subject matter described herein

FIG. 1 depicts a flowchart of an exemplary process that may conducted by a SIP based access proxy element (e.g., an IMS access proxy element), regardless of being embodied as a softswitch model, an adjunct proxy element model, or a switchless model. In the following example, it is understood that the IMS access proxy element has established a network connection via a dedicated data connection (i.e., network attachment).

In block 102, mappings of legacy line identifiers and assigned SIP registration identifiers, such as IMS identifiers, are created. In one embodiment, the IMS access proxy element (e.g., a softswitch, a proxy adjunct element, a switchless element, etc.) may be connected to a plurality of PSTN peripheral devices, such as TDM switches and/or copper-line aggregation devices (e.g., GR303 and TR08 devices). The PSTN peripheral devices serve to connect legacy endpoint devices to the IMS access proxy element. As described herein, a legacy endpoint device may be defined as any user endpoint device that utilizes legacy copper wire or hybrid fiber-coaxial (HFC) cable to communicate media signals within a PSTN. For example, a legacy endpoint device may include a plain old telephone services (POTS) phone, a coin pay phone, an integrated services digital network (ISDN) basic rate interface (BRI) device, a proprietary phone, or any phone that utilizes HFC or TDM/copper hosted lines. The IMS access proxy element may also be connected to a SIP-based core network, such as an IMS core network. In order to provide SIP-based service to the legacy endpoint devices, the IMS access proxy element may be provisioned with a database that contains "assigned SIP registration identifiers" allocated by the service provider network (e.g., in one embodiment, IP multimedia private identity identifiers (IMPIs)) that are respectively mapped to an identifier associated with each of the legacy endpoint devices or legacy peripheral devices serviced by the IMS access proxy element. For example, the IMS access proxy element may first establish the mapping state by utilizing an assigned SIP registration identifier that is typically created by the telephone company that provides service to the legacy device. The assigned SIP registration identifier may be a network identifier (e.g., allison.smith@telco.com) that may be used for others to contact the subscriber or used by the telephone company for internal routing and control purposes. In some instances, the network identifier may be a unique identifier such as a URL. The network identifier may be manually created and stored in the back office system with other subscriber profile information (e.g., a directory number, a billing address, subscription details, location, etc.).

The IMS access proxy element may then link the assigned SIP registration identifier to a known legacy line identifier. An exemplary legacy line identifier may include a directory number, a subscriber phone number, or a line termination identifier (e.g., an identifier associated with an individual line card identifier, a line group private identifier, a line termination device identifier, or line termination port identifier) associated with one or more legacy devices. Legacy line identifiers are readily assignable since the proxy element is attached/connected to legacy endpoint devices or legacy peripheral devices (which subtend the legacy endpoint device) via physical copper lines or HFC cable. This mapping of the assigned SIP registration identifier and the legacy line identifier may be recorded in a local (or external) mapping database during or after a successful IMS/SIP registration process.

In block 104, legacy devices are registered with the SIP based network, e.g., an IMS network, using the mapped subscriber identifiers. In one embodiment, a proxy call session control function (P-CSCF) module located on the IMS access proxy element directs a SIP REGISTER message to an IMS core network over an Mw interface to register one or more of the legacy endpoint devices (i.e., the proxy element may register the legacy endpoint devices in bulk or individually) serviced by the proxy element. From the perspective of the IMS core network, the REGISTER message appears to be originated from an IMS agent. During the IMS registration process, an IMS/SIP server (e.g., an S-CSCF server) in the IMS core network utilizes the assigned SIP registration identifier (or legacy peripheral device identifier if registering in bulk) provided in the REGISTER message to create a mapping to be used within the IMS core network. For example, the IMS/SIP server may map the received assigned SIP registration identifier to a public subscriber profile associated with the registering legacy device. This mapping may be stored by the IMS/SIP server in a home subscriber server (HSS) element in the IMS core network. After the mapping is performed and recorded in the HSS, an acknowledgement message may be transmitted to the IMS access proxy element from the IMS network. For example, an S-CSCF server in the IMS core network may send a 200 OK acknowledgement message to a P-CSCF module in the proxy element indicating that the IMS registration process was conducted successfully.

After the registration is established, the proxy element may also be configured to maintain the IMS registration for the legacy endpoint devices. For example, the IMS/SIP registration process establishes and maintains a SIP registration session that allows SIP-based calls to be made and received from legacy endpoint devices via the IMS access proxy element. However, IMS/SIP registration sessions include built-in timeout mechanisms which act as a security feature and terminate a SIP registration session if no calls have been made during the predetermined timeout period. Accordingly, the proxy element may be configured to periodically send IMS registration messages to the IMS core network to re-register the legacy device. By doing so, the proxy element may maintain the SIP registration session (i.e., re-register prior to the timeout period) so active calls handled by the proxy element are not terminated and/or new call attempts are not blocked or delayed. In block 106, a communication is received from a legacy device. In one embodiment, the IMS access proxy element may receive a call setup request from a legacy endpoint device directly or via a TDM switch or line aggregation device (depending on the embodiment type of the proxy element).

Figure 2:
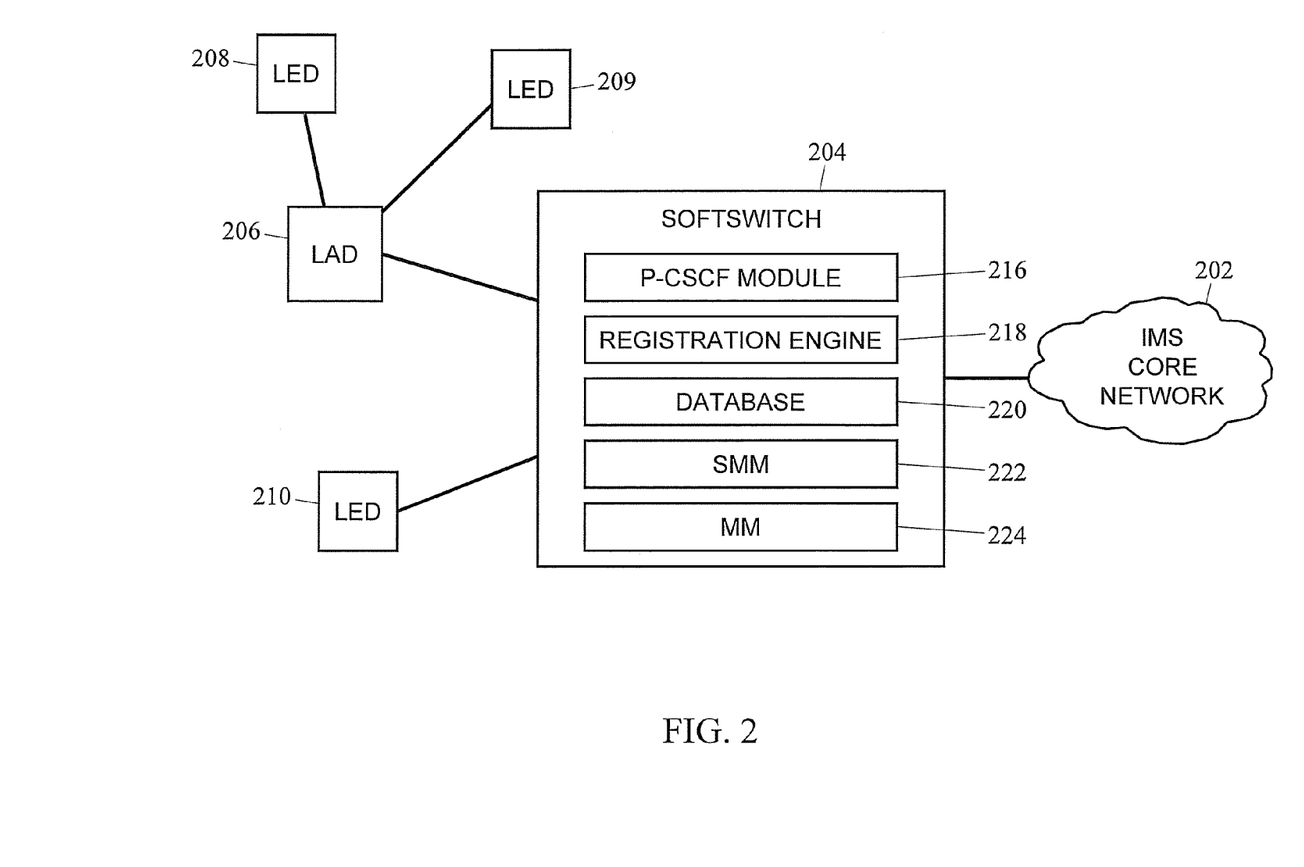
FIG. 2 is a block diagram illustrating a softswitch functioning as an IMS access proxy gateway according to an embodiment of the subject matter described herein.

In block 108, the communications session is maintained by interworking between the SIP call control protocol and the legacy control protocol (e.g., a legacy line control protocol or legacy device control protocol). In one embodiment, the proxy element may then use the mapping of the legacy line identifier (associated with the calling legacy party device) to the assigned SIP registration identifier to forward a SIP INVITE message to the IMS core network. For example, the IMS access proxy element may use the mapping to translate the appropriate legacy control protocol (e.g., a legacy line control protocol or legacy device control protocol) for the copper line endpoint to an IMS based SIP call control protocol. Thus, the proxy element is able to send a SIP INVITE message in lieu of a PSTN-based call setup request because 1) the legacy device has been previously registered with the IMS core network (see block 104) and 2) the proxy element can use the legacy line identifier-assigned SIP registration identifier mapping to convert or interwork the PSTN message to a SIP based message. At this point in time, the IMS access proxy element handles/manages the communication between the calling legacy endpoint device and the called party. For example, the IMS access proxy element may utilize the mapped database entry (i.e., the subscriber identifier-legacy device identifier mapping) to facilitate the call session involving the legacy device and the IMS core network. Similarly, the IMS access proxy element may also map an IMS based SIP call control protocol into an appropriate legacy control protocol used by the legacy device. As mentioned above, the IMS access proxy element may be embodied in an existing softswitch, i.e., a softswitch integrated model. FIG. 2 depicts an exemplary softswitch 204 (or media gateway controller) that is communicatively coupled to an IMS core network 202 and capable of supporting copper line terminations to a number of legacy endpoint devices, either directly or via legacy peripheral devices, as well as providing a variety of local service capabilities. Although FIG. 2 depicts an IMS core network 202, the softswitch may be utilized with any SIP based core network without deviating from the present subject matter. In one embodiment, softswitch 204 may be configured to support a plurality of legacy peripheral device interfaces, such as interfaces associated with a line aggregation device (LAD) 206 (e.g., a TR08 or GR303 device). For example, LAD 206 may be configured to receive one or more connections from a plurality of legacy endpoint devices (LEDs) 208-210 (e.g., TDM phones, POTS phones, coin phones, etc.). Although FIG. 2 depicts softswitch 204 only supporting one line aggregation device and three legacy endpoint devices, any number of aggregation and endpoint devices may be supported without departing from the scope of the present subject matter. By supporting the direct legacy line terminations (and the respective legacy device interface protocols), softswitch 204 is able to act as a SIP proxy and convert communications originating from the legacy line terminations into IMS communications to be received by IMS core network 202, and vice versa.

In one embodiment, softswitch 204 is configured to include a P-CSCF module 216, a registration engine 218, a local mapping database 220, a session management module 222, and a maintenance module 224. In one embodiment, mapping database 220 may instead be a database that is located external to softswitch 204. Mapping database 220 may be used to store the mappings of legacy lines identifiers and assigned SIP registration identifiers. P-CSCF module 216 may be configured to communicate with a CSCF element (e.g., an I-CSCF) in IMS core network 202, and as such, enables softswitch 204 to appear as a P-CSCF residing in a foreign network to the IMS core network 202. Similarly, the use of P-CSCF module 216 allows the legacy devices supported in the PSTN to appear as subtended IMS agents to the IMS core network 202.

Softswitch 204 may also include a registration engine 218 that works in conjunction with P-CSCF 216 to establish and maintain IMS communications with IMS core network 202. Notably, registration engine 218 may be configured to register all of the subscribers associated with the legacy lines hosted by the legacy peripheral devices, maintain the IMS registration state, and update the IMS registration state of any legacy line (e.g., when lines are placed in or out of service). In one embodiment, P-CSCF 216 registers (either individually or as a group) all of the subscribers of the legacy lines hosted by the peripheral device with the IMS core network (e.g., via IMS registration).

For example, registration engine 218 may be configured to initiate and manage the registration of a legacy device (which is unable to IMS register) into IMS core network 202. Specifically, registration engine 218 may be configured to issue a SIP REGISTER message (via P-CSCF module 216) that is received by an I-CSCF in IMS core network 202. Once the SIP REGISTER message is received in IMS core network 202, the IMS registration process is conducted normally within IMS core network 202.

Prior to or during the IMS registration process, registration engine 218 may create a mapping relationship in database 220 between the non-registering legacy device and a subscriber identifier. Normally, IMS core network 202 requires an IMS agent establishing or facilitating an IMS session to be identified with an IMS identifier (i.e., the assigned SIP registration identifier) such as a subscriber identity module (SIM) number, a packet cable device name, a GSM device name, a uniform resource identifier (URI), a uniform resource locator (URL), and the like. However, legacy endpoint devices or line cards found in the PSTN typically are not provisioned or associated with such identifiers. Therefore, registration engine 218 may be configured to assign an assigned SIP registration identifiers (e.g., obtained from the telephone company) to a legacy line on an individual or group basis. In one embodiment, registration 218 may assign an assigned SIP registration identifier before the legacy endpoint device is brought into service (e.g., in the PSTN). Accordingly, registration engine 218 may be configured to register the legacy endpoint device into a SIP based network before the legacy endpoint device is brought into service. Once the assigned SIP registration identifier is assigned to a legacy line, registration engine 218 records this legacy identifier-subscriber identifier mapping in database 220. In one embodiment, an entry in database 220 may include a legacy identifier (e.g., a subscriber directory number (DN), a line termination identifier, a line card identifier, a line group identifier, etc.), that is mapped to the subscriber identifier. More importantly, the legacy identifier-subscriber identifier mapping enables softswitch 204 to function as a proxy to network 202 in order to manage a call session between IMS core network 202 and a legacy device in the PSTN.

In one embodiment, softswitch 204 may facilitate the call session by mapping SIP based call control protocols (e.g., IMS) into an appropriate legacy control protocol (e.g., a legacy line control protocol or legacy device control protocol) and/or vice versa. For example, session management module 222 in softswitch 204 may be utilized to map IMS Mw (SIP) call control to a proprietary TDM device driving protocol (e.g., GR303, TR08, NCS, and other proprietary protocols) to interface with the line cards that are supporting the legacy endpoint devices. Thus, by converting a legacy call control protocol to a SIP call control protocol (and vice versa), softswitch 204 is able to present a legacy-based call to IMS core network 202 as a standard IMS call. For example, softswitch 204 may map/convert a POTS offhook signal (and in some embodiments, digits) to a SIP INVITE message.

In one embodiment, registration engine 218 is also configured to manage and maintain the registration state of the legacy devices into IMS core network 202. For example, registration engine 218 may be used to simulate and manage SIP registration timeout periods and re-registrations.

In one embodiment, softswitch 204 also includes a maintenance module 224 that performs all the maintenance activities associated with the supported legacy lines. For example, maintenance module 224 may function in cooperation with registration engine 218 to add, move, and change lines during maintenance periods. Notably, maintenance module 224 may communicate with registration engine 218 so that the registration state of a line that is undergoing maintenance is updated (e.g., via re-registering and/or de-registering processes) with the IMS core network 202.

In one embodiment, softswitch 204 is also modified such that all legacy line residential originations are routed to IMS core network 202 via a Mw interface even if the terminating device is hosted by the same softswitch (i.e., the ½ call model). In this ½ model, softswitch 204 may be configured with sufficient intelligence to leverage a full set of local features (e.g., call waiting, call forwarding, call presentation/presentation restrictions, etc.) in order to ensure full feature transparency. This transparency may also include a number of intelligent network (IN) originating and terminating triggers, as well as a direct interconnection to fixed 911 services (as opposed to utilizing an emergency-CSCF).

In short, the softswitch integrated model configures or enables an existing softswitch with the above-mentioned extensions to represent the legacy devices (i.e., hosted copper end-users) as IMS subscribers into a SIP based network, such as IMS core network 202, while maintaining existing legacy access equipment and feature transparency. Using IMS core network 202, a common translation/routing/interconnect infrastructure can be supported in addition to advanced services, such as Fixed Mobile Convergence (FMC), residential converged desktop, and the like.

Figure 3:
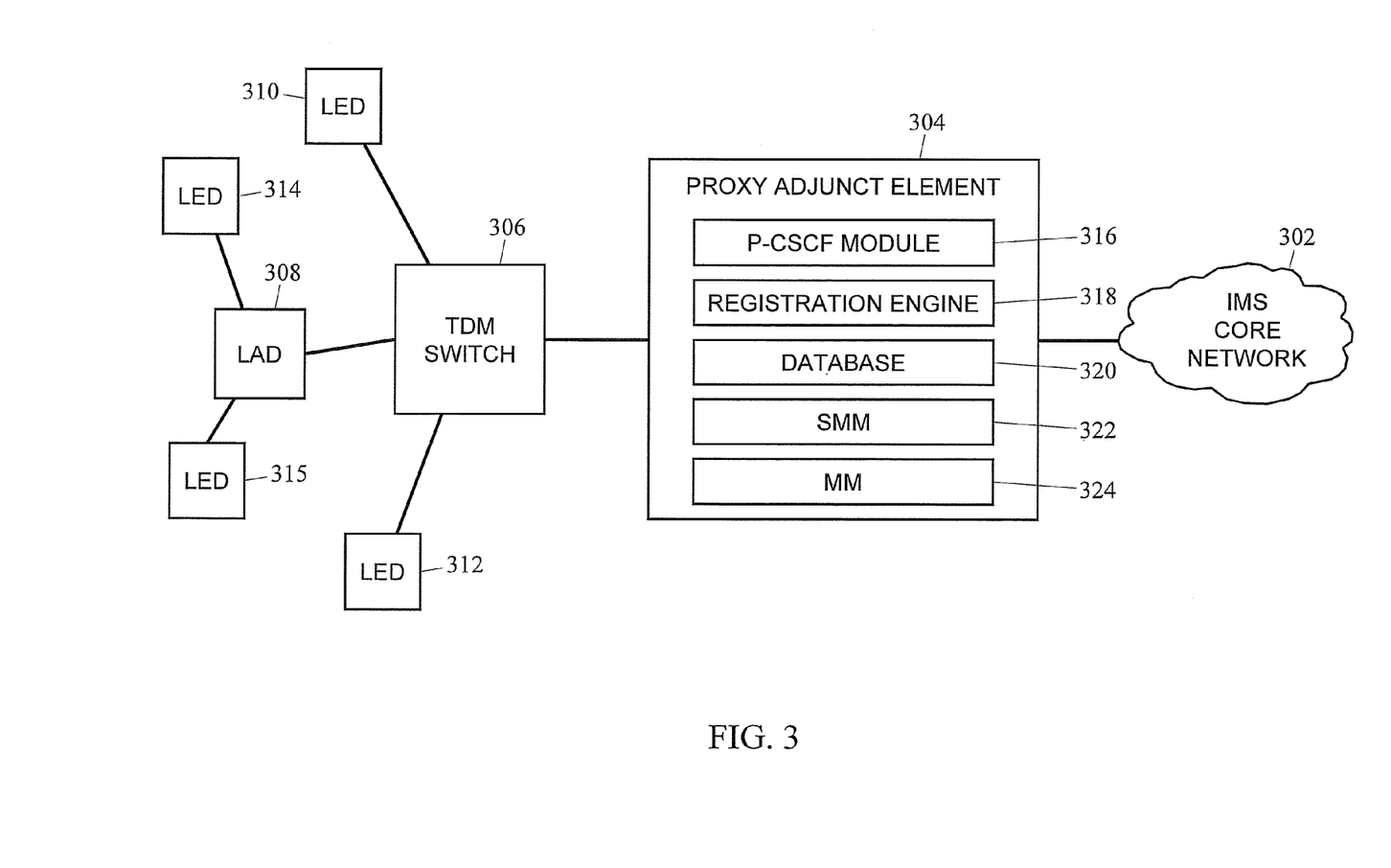
FIG. 3 is a block diagram illustrating a proxy adjunct element functioning as an IMS access proxy gateway according to an embodiment of the subject matter described herein.

In another embodiment, the IMS access proxy element may be embodied as a legacy switch adjunct model. This deployment model may be used with legacy switches (e.g., TDM switches) that cannot be upgraded or collapsed to an existing softswitch (as previously depicted in FIG. 2). As shown in FIG. 3, a separate proxy adjunct element 304 may be positioned between a TDM-based switch 306 and IMS core network 302. Although FIG. 3 depicts an IMS core network 302, the proxy adjunct element may be utilized with any SIP based core network without deviating from the present subject matter. Proxy adjunct element 304 appears as a P-CSCF to IMS core network 302 as well as being configured to support an ISUP interface or IN interface associated with a connection from TDM switch 306. In one embodiment, proxy adjunct element 304 is also responsible for performing the IMS registration of legacy endpoint devices that are communicatively coupled (either directly or via legacy peripheral devices) to the TDM switch 306. Thus, the proxy adjunct element effectively represents the TDM switch into the IMS core network 302. Although FIG. 3 depicts proxy adjunct element 304 connected to only one TDM switch 306, additional TDM switches may be supported without departing from the scope of the present subject matter.

In one embodiment, proxy adjunct element 304 is configured to include a P-CSCF module 316, registration engine 318, a local mapping database 320, a session management module 322, and a maintenance module 324. In one embodiment, database 320 may be a database located external to proxy adjunct element 304. Mapping database 320 may be used to store the mappings of legacy lines identifiers and private network subscriber identifiers. Registration engine 318 may be configured to function along with P-CSCF module 316 to establish and maintain IMS communications with IMS core network 302. Notably, registration engine 318 may be configured to register the legacy lines connected to TDM switch 306, maintain the IMS registration state, and update the IMS registration state of any legacy line. For example, registration engine 318 may be configured to initiate and manage the registration of any one of legacy endpoint devices (LEDs) 310-315 into the IMS core network 302. Notably, proxy adjunct element 304 is capable of supporting a legacy endpoint device directly connected to the interfaced TDM switch 306 or supporting a legacy endpoint device indirectly connected to TDM switch 306, such as via a line aggregation device 308.

In one embodiment, registration engine 318 may create a mapping relationship in database 320 between the TDM switch and an assigned SIP registration identifier, such as an IMS identifier. For example, registration engine 318 may acquire an identifier for both the TDM switch and a subtended legacy endpoint device (e.g., a directory number) which are then collectively mapped to a single assigned SIP registration identifier. Peripheral device identifiers and line card identifiers are not necessary in this embodiment since these types of devices are incorporated within (i.e., are a part of) the TDM switch. Notably, the proxy element needs to know the identifier of the TDM switch hosting the legacy endpoint device as well as the legacy endpoint device identifier. This combined legacy identifier-IMS identifier mapping enables proxy adjunct element 304 to function as a proxy for the TDM switch into the IMS core network. In one embodiment, registration engine 318 may perform the mapping process by creating an entry in database 320 by assigning an IMS identifier to the legacy line used by the TDM switch 306. For example, proxy adjunct element 304 may be configured to map a subscriber directory number with an IMS identifier that may later be used for registration and initiation of an IMS call/session. In one embodiment, registration engine 318 may be configured to issue a SIP REGISTER message (via P-CSCF module 316) that is received by an I-CSCF in IMS core network 302. Once the SIP REGISTER message is received in IMS core network 302, the IMS registration process is conducted normally within IMS core network 302.

Proxy adjunct element 304 may act as a proxy to establish and manage a call session (e.g., a SIP registration session associated with setting up a call) involving a legacy endpoint device that is serviced by the IMS core network and TDM switch 306. In one embodiment, proxy adjunct element 304 may establish and maintain the call session by mapping the IMS/SIP call control protocol into an appropriate legacy control protocol (e.g., a legacy line control protocol or legacy device control protocol) utilized by TDM switch 306 (and/or vice versa). For example, session management module 322 in proxy adjunct element 304 may be utilized to convert a SIP call control protocol into a TDM switch control/interconnect protocol to interface with the legacy endpoint devices or the line cards that are supporting the legacy endpoint devices. In one embodiment, this may involve session management module 322 converting the TDM communication protocols (such as ISUP, IN, PRI, H.323, etc.) to SIP. Thus, proxy adjunct element 304 is able to present a legacy-based call session from TDM switch 306 into IMS core network 302 as a standard IMS call.

In one embodiment, proxy adjunct element 304 may be configured to transmit PSTN signaling (e.g., ISUP signals) to IMS core network 302 by converting PSTN signals to IMS SIP signals. The IMS SIP signals are then transmitted by P-CSCF module 316 to the IMS core network 302 via an Mw interface. In one embodiment, proxy adjunct element 304 may also convert bearer signals to RTP signals. Proxy adjunct element 304 may then send the RTP signals to IMS core network 302. Accordingly, proxy adjunct element 304 may be communicatively coupled to a companion media gateway function (not shown) for converting the bearer path from TDM to VoIP (e.g., RTP). The media gateway function may be embedded in proxy adjunct element 304 or may reside in a separate element that is under the control of proxy adjunct element 304.

As per the softswitch model, the local host switch may maintain a number of local features for its hosted lines included local routing emergency services. Examples of local features include, but are not limited to, call waiting, call forwarding, call presentation/presentation restrictions, and the like. If a policy interface is required, the proxy adjunct element 304 may support that as part of P-CSCF module 316.

In another embodiment, the IMS access proxy element may be embodied as a switchless model which facilitates direct line card aggregation device hosting. This is a further extension of the present subject matter where the local TDM switch intelligence is removed and a switchless proxy element 404 illustrated in FIG. 4 directly interfaces with the line aggregation device (LAD) nodes 410-414 via GR303, TR08, or proprietary telecomm equipment manufacturer (TEM) interfaces. In one embodiment, switchless proxy element 404 performs basic call control functions by converting line aggregation device protocols (e.g., TR08 and GR303 protocols) into SIP. In one embodiment, switchless proxy element 404 registers all the legacy endpoint devices into the IMS core network 402 and provisions a database 420 in order to map the legacy endpoint devices with associated assigned SIP registration identifiers (e.g., IMS identifiers). Switchless proxy element 404 is then able to maintain a communication session by receiving communications from line aggregation devices 410-414 and converting the communications from the proprietary protocols into SIP. The converted SIP communications are then forwarded to IMS core network 402. Thus, switchless proxy element 404 is able to proxy legacy copper lines in a manner where the legacy copper lines appear as IMS lines to IMS core network 402.

Figure 4:
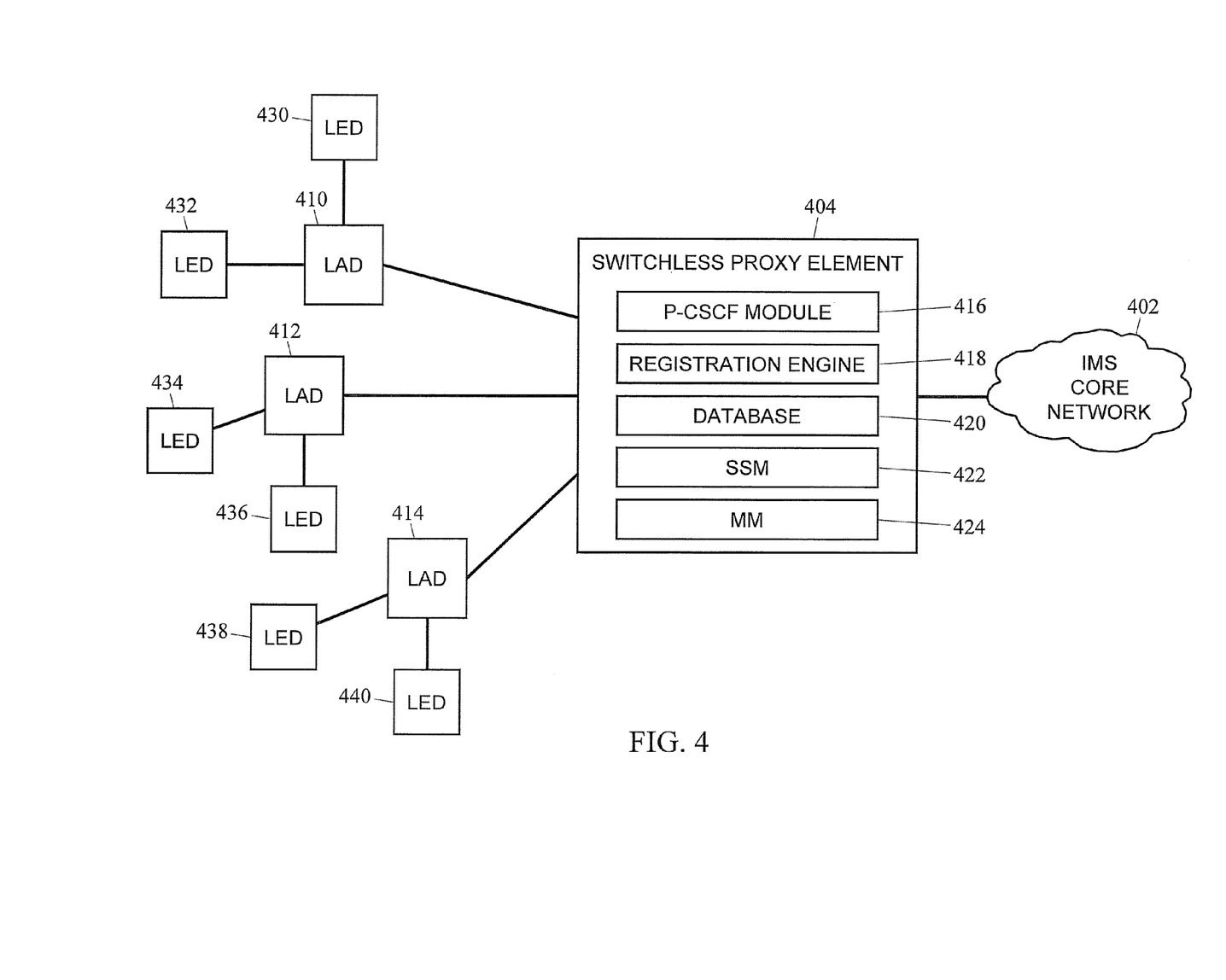
FIG. 4 is a block diagram illustrating a switchless proxy element functioning as an IMS access proxy gateway according to an embodiment of the subject matter described herein.

Feature control may be via the IMS TAS and the IMS core emergency call support would be leveraged. In this model, the switchless proxy element 404 may also need to take on a maintenance control (aggregation element manager role) for line and node maintenance and test. In one embodiment, a maintenance module 424, such as a test head or the like, may be included in the proxy element.

In one embodiment, switchless proxy element 404 is configured to include a P-CSCF module 416, registration engine 418, a database 420, a session management module 422, and a maintenance module 424. In one embodiment, database 420 may be database located external to switchless proxy element 404. Registration engine 418 may be configured to function along with P-CSCF module 416 to establish and maintain IMS communications with IMS core network 402. Notably, registration engine 418 may be configured to register the legacy lines connected to the line aggregation devices, maintain the IMS registration state, and update the IMS registration state of any legacy line. For example, registration engine 418 may be configured to initiate and manage the registration of any one of legacy endpoint devices (LEDs) 430-440 into IMS core network 420. Notably, switchless proxy element 404 is capable of supporting a legacy endpoint device directly connected to one of the interfaced line aggregation devices 410-414.

In one embodiment, registration engine 418 may be configured to issue a SIP REGISTER message (via P-CSCF module 416) that is subsequently received by an I-CSCF in IMS core network 402. Once the SIP REGISTER message is received in IMS core network 402, the IMS registration process is conducted normally within IMS core network 402. As the IMS registration process is conducted, registration engine 418 may create a mapping relationship in database 420 between a non-registering legacy device and an assigned SIP registration identifier (e.g., an IMS identifier). Namely, the legacy identifier-assigned SIP registration identifier mapping enables switchless proxy element 404 to function as a proxy. In one embodiment, an entry in database 420 may include a line termination identifier (e.g., an identifier of a line card in a line aggregation device) that is mapped to an assigned SIP registration identifier.

During or prior to IMS registration being conducted (i.e., acknowledged), registration engine 418 may perform the mapping process by creating an entry in database 420 by assigning an assigned SIP registration identifier to the legacy line used by the line aggregation device. For example, switchless proxy element 404 may be configured to map a line termination identifier (corresponding to the line aggregation device) with an IMS identification number for registration and initiation of an IMS call/session. Namely, switchless proxy element 404 may act as a proxy to manage a call session (i.e., register and maintain the IMS session) between the IMS core network and a line aggregation device. In one embodiment, switchless proxy element 404 may maintain the call session by mapping the call control from SIP into an appropriate legacy control protocol (e.g., a legacy line control protocol or legacy device control protocol) utilized by the line aggregation device (e.g., TR08 or GR303). For example, session management module 422 in switchless proxy element 404 may be utilized to convert SIP to a line aggregation device protocol to interface with the line cards that are supporting the legacy endpoint devices.

In one embodiment, switchless proxy element 404 may be configured to transmit PSTN signaling (e.g., G303, TR08, H.323, and ISDN signals) to IMS core network 402 by converting the PSTN signals to IMS SIP signals. The IMS SIP signals are then transmitted by P-CSCF module 416 to the IMS core network 402 via an Mw interface.

In one embodiment, switchless proxy element 404 may also convert bearer signals to RTP signals. Switchless proxy element 404 may then send the RTP signals to IMS core network 402. Accordingly, switchless proxy element 404 may be communicatively coupled to a companion media gateway function (not shown) for converting the bearer path from TDM to VoIP (e.g., RTP). The media gateway function may be embedded in switchless proxy element 404 or may reside in a separate element that is under the control of switchless proxy element 404.

In conclusion, the IMS access proxy gateway bridges the gap between IMS and legacy lines for which there is no incentive to change or upgrade the copper line access (e.g., put in MSANs, cable, PON, etc.). The present subject matter also permits a modest investment in softswitches and packet line gateways (PLGs) for office collapse/consolidation are not stranded and has a clear fit in future IMS core networks.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A session initiation protocol (SIP)-based access proxy device performing call session control functions, comprising:
    a processor; and
    a memory coupled to the processor, the memory having program instructions stored thereon that, upon execution by the processor, cause the SIP-based access proxy device to:
        create a mapped entry in a database, wherein the entry associates a SIP registration identifier to a legacy identifier corresponding to a plain old telephone service (POTS) end-user communication device, wherein the POTS end-user communication device utilizes a legacy call control protocol;
        register the POTS end-user communication device into a SIP-based network using the associated SIP registration identifier, wherein a SIP registration message includes the associated SIP registration identifier is sent to a call control function in an Internet protocol multimedia subsystem (IMS) core network;
        receive a communication session request from the POTS end-user communication device via the legacy call control protocol;
        establish the requested communication session on behalf of the POTS end-user communication device by converting between the legacy call control protocol and a SIP-based call control protocol using the mapped entry in the database, wherein the legacy identifier of the POTS end-user communication device is provided only to the SIP-based access proxy device; and
        perform call session control functions for the requested communication, wherein the legacy identifier of the POTS end-user communication device is provided only to the SIP-based access proxy device.

2. The SIP-based access proxy device of claim 1, wherein the program instructions, upon execution by the processor, further cause the SIP-based access proxy device to add a line, move a line, or change a line associated with the POTS end-user communication device.

3. The SIP-based access proxy device of claim 1, wherein the POTS end-user communication device includes an endpoint device that is coupled to the SIP based access proxy device via one or more hosted copper lines or hybrid fiber-coaxial (HFC) cables.

4. The SIP-based access proxy device of claim 3, wherein the POTS end-user communication device includes at least one of: a coin pay phone or a POTS phone.

5. The SIP-based access proxy device of claim 1, wherein the legacy identifier corresponding to the POTS end-user communication device includes a line termination device identifier, a line termination port identifier, a directory number, or a subscriber phone number.

6. The SIP-based access proxy device of claim 1, wherein the associated SIP registration identifier includes at least one of: a subscriber identity module (SIM) identifier, an Internet protocol multimedia subsystem (IMS)/global system for mobile communications (GSM) device name, an IMS/GSM packet cable device name, a uniform resource indicator (URI), an Internet protocol multimedia private identity (IMPI), or a uniform resource locator (URL).

7. The SIP-based access proxy device of claim 1, wherein the SIP-based access proxy device comprises at least one of a softswitch, a media gateway controller, or a media gateway.

8. The SIP-based access proxy device of claim 1, wherein the SIP-based access proxy device is interfaced with a time division multiplexing (TDM) switch, and wherein the program instructions, upon execution by the processor, further cause the SIP-based access proxy device to associate the associated SIP registration identifier with a TDM switch identifier.

9. The SIP-based access proxy device of claim 1, wherein the SIP-based access proxy device directly interfaces with one or more line aggregation devices.

10. A method, comprising:
    at a Session Initiation Protocol (SIP) based access proxy device performing call session control functions and communicatively coupled to a SIP-based network:
        creating a mapped entry in a database, wherein the entry associates a SIP registration identifier to a legacy identifier corresponding to a plain old telephone service (POTS) end-user communication device, wherein the POTS end-user communication device utilizes a legacy call control protocol;
        registering the POTS end-user communication device into a SIP-based network using the associated SIP registration identifier, wherein a SIP registration message includes the associated SIP registration identifier is sent to a call control function in an Internet protocol multimedia subsystem (IMS) core network;
        receiving a communication session request from the POTS end-user communication device via the legacy call control protocol;
        establishing the requested communication session on behalf of the POTS end-user communication device by converting between the legacy call control protocol and a SIP-based call control protocol using the mapped entry in the database, wherein the legacy identifier of the POTS end-user communication device is provided only to the SIP-based access proxy device; and
        perform call session control functions for the requested communication, wherein the legacy identifier of the POTS end-user communication device is provided only to the SIP-based access proxy device.

11. The method of claim 10, further comprising maintaining the registration of the POTS end-user communication device in an event a legacy line associated with the POTS end-user communication device is added, moved, or changed.

12. The method of claim 10, wherein the POTS end-user communication device includes an endpoint device that is coupled to the SIP-based access proxy device via one or more hosted copper lines or hybrid fiber-coaxial (HFC) cables.

13. The method of claim 12, wherein the POTS end-user communication device includes at least one of: a coin pay phone or a POTS phone.

14. The method of claim 10, wherein the legacy identifier corresponding to the POTS end-user communication device includes a line termination device identifier, a line termination port identifier, a directory number, or a subscriber phone number.

15. The method of claim 10, wherein the associated SIP registration identifier includes at least one of: a subscriber identity module (SIM) identifier, an Internet protocol multimedia subsystem (IMS)/global system for mobile communications (GSM) device name, an IMS/GSM packet cable device name, a uniform resource indicator (URI), an Internet protocol multimedia private identity (IMPI), or a uniform resource locator (URL).

16. The method of claim 10, wherein the SIP-based access proxy device comprises at least one of: a softswitch, a media gateway controller, or a media gateway.

17. The method of claim 10, wherein the SIP-based access proxy device comprises a proxy adjunct element that is interfaced with a time division multiplexing (TDM) switch, and wherein the method further includes associating the associated SIP registration identifier with a TDM switch identifier.

18. The method of claim 10, wherein the SIP-based access proxy device comprises a switchless proxy element that directly interfaces with one or more line aggregation devices.

19. A memory storage device having executable instructions stored thereon that, upon execution by a processor of a computer configured as a Session Initiation Protocol (SIP) based access proxy device, causes the computer to:
create a mapped entry in a database, wherein the entry associates a Session Initiation Protocol (SIP) registration identifier to a legacy identifier corresponding to a plain old telephone service (POTS) end-user communication device, wherein the POTS end-user communication device utilizes a legacy call control protocol;
register the POTS end-user communication device into a SIP-based network using the associated SIP registration identifier, wherein a SIP registration message includes the associated SIP registration identifier is sent to a call control function in an Internet protocol multimedia subsystem (IMS) core network;
receive a communication session request from the POTS end-user communication device via the legacy call control protocol;
establish the requested communication session on behalf of the POTS end-user communication device by converting between the legacy control protocol and a SIP-based call control protocol using the mapped entry in the database, wherein the legacy identifier of the POTS end-user communication device is provided only to the SIP-based access proxy device; and
perform call session control functions for the requested communication, wherein the legacy identifier of the POTS end-user communication device is provided only to the SIP-based access proxy device.

* * * * *